R. J. SCHONE.
LOCK FOR DEMOUNTABLE RIMS.
APPLICATION FILED JAN. 5, 1916.
1,197,768.
Patented Sept. 12, 1916.
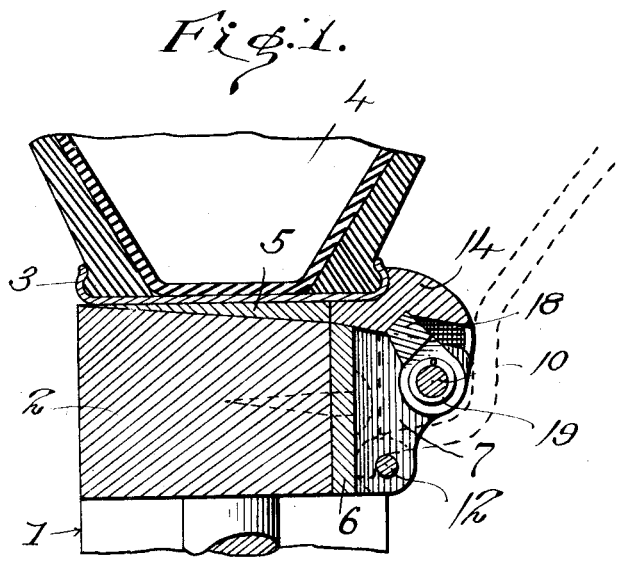
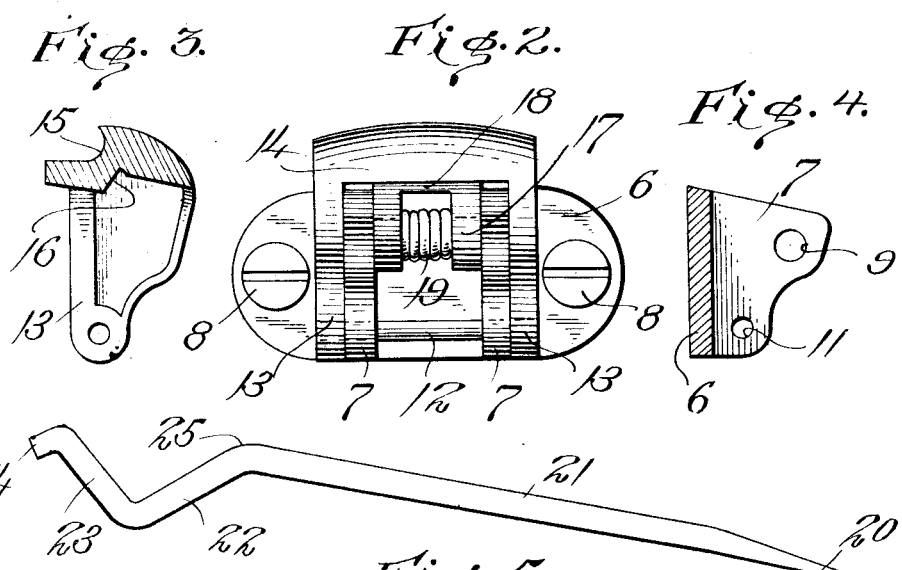
INVENTOR
RALPH J. SCHONE
WITNESSES
BY
ATTORNEY

UNITED STATES PATENT OFFICE.

RALPH J. SCHONE, OF ST. CHARLES, MISSOURI.

LOCK FOR DEMOUNTABLE RIMS.

1,197,768.  Specification of Letters Patent.  Patented Sept. 12, 1916.

Application filed January 5, 1916. Serial No. 70,531.

*To all whom it may concern:*

Be it known that I, RALPH J. SCHONE, a citizen of the United States, residing at St. Charles, in the county of St. Charles and State of Missouri, have invented certain new and useful Improvements in Locks for Demountable Rims, of which the following is a specification.

This invention relates to demountable rims for automobile wheels and has particular reference to an improved means of securing a rim upon a wheel felly.

The principal object of the invention is to provide a means of the character stated which will require but a minimum of time and labor to operate to release a rim from or secure a rim upon the felly of a wheel.

Another object of the invention is to provide securing means which will automatically lock itself to secure the rim upon the felly.

A further object of the invention is to provide a securing means formed from a minimum number of parts which may be manufactured and assembled at small cost and which may be applied to vehicle wheels of various descriptions.

With the foregoing and other objects in view, the invention consists in the novel features of construction, combination and arrangement of parts as will be hereinafter more fully described, illustrated in the accompanying drawings, and claimed.

In the drawings:—Figure 1 is a fragmentary transverse sectional view through an automobile wheel showing the improved locking means for the rim of the wheel mounted upon the felly. Fig. 2 is a front elevation of the locking means removed from the wheel. Fig. 3 is a transverse sectional view through the rim clamping member. Fig. 4 is a transverse sectional view through the bracket; and Fig. 5 is a side elevation of a tool used in connection with the improved securing device for locking or unlocking the same upon the rim of the tire.

Referring to the drawings by numerals wherein is illustrated the preferred embodiment of my invention, 1 designates a vehicle wheel including a felly 2 upon the outer face of which is adapted to be mounted the rim 3 carrying a tire 4. The outer face of the felly 2 is tapered transversely as clearly illustrated in Fig. 1 of the drawings while the rim 3 carries upon its inner face and has secured thereto in any suitable manner a tapered block 5 for engagement with the tapered face of the felly. By this arrangement the tire and rim may be readily applied upon the felly 2 by sliding the same transversely upon the felly until the tapered faces of the block 5 and felly 2 engage, engagement between the said tapered faces of the block and felly serving to prevent further transverse movement of the rim upon the felly as will be understood.

After the rim has been applied upon the felly and the tapered faces of the block 5 and felly 2 engaged it is necessary to provide means to prevent accidental removal of the rim from the felly in the direction from which it is applied. The improved locking means for accomplishing this purpose comprises a plate 6 which has formed thereon upon its outer face a pair of spaced flanges 7 and which is provided with openings adjacent its ends to receive fastening elements such as screws or lag-bolts 8 to secure the same to one side face of the felly.

The flanges 7 are substantially triangular in shape having their bases uppermost tapering toward the lower end of the plate 6. Near the upper outer edges of these flanges are formed openings 9 arranged in alinement to receive a pin 10 while near the lower edge of the flanges are formed other openings 11 which are alined and are adapted to receive a second pin 12. This pin 12 extends past the outer faces of the flanges 7 a suitable distance and has mounted thereon for swinging movement the arms 13 of a substantially inverted U-shaped locking member 14. This locking member is provided upon its inner face with a recessed portion 15 shaped to fit the exterior face of the rim 3 while upon its inner face, the same is provided with an angularly arranged wall 16 for a purpose which will presently appear.

Mounted upon the pin 10 for swinging movement are the arms 17 of a substantially inverted U-shaped dog 18, a coil spring 19 being wound about the pin 10 between the arms of the dog and having one end engaged with one of the arms of the dog and the other end engaged with the pin 10 to normally exert a tension to force the dog upwardly and outwardly.

In operation the rim is first placed upon the felly of the wheel in the ordinary manner until the tapered faces of the block 5 and felly 2 are engaged and the locking member 14 is then swung upon its pivot 12 until the recessed portion 15 thereof engages with the outer edge of the rim. Pressure is then applied to the locking member to force the same inwardly and thus clamp the rim securely upon the felly whereupon the dog 18 actuated by the spring 19 will be forced upwardly into engagement with the angular wall 16 of the locking member to prevent its outward swinging movement. When it is desired to remove the rim, the pointed end 20 of a tool 21 is inserted between the upper face of the dog 18 and the under face of the connecting portion of the U-shaped locking member 14 and pressure exerted thereon to force the inner end of the dog downwardly to release the same from engagement with the angular face 16. The locking member 14 may then be swung downwardly and the rim removed from the felly.

The tool 21 may have one end formed into a shape to especially adapt the same for use in forcing the locking member into engagement with the rim of the tire when it is desired to lock the rim upon the felly. A suitable distance from this end of the tool, the same is bent upon itself at a slight angle as indicated at 22 and is again bent at 23 at substantially right angles to the bend 22, the terminal end 24 being again bent in the direction of the bend 22 and at substantially right angles to the bend 23. When this tool is arranged as shown in dotted lines in Fig. 1 of the drawings with the portion 24 behind the pin 12 and the point 25 at the intersection of the bend 22 with the body portion 21 in engagement with the connecting portion of the U-shaped locking member 14 an upward pressure upon the free end of this tool will serve to force the locking member into engagement with the rim, the bending of the tool at 22 and 23 serving to provide an offset portion to extend around the pin 10 so that as the tool is forced upwardly it will not engage with the pin, spring, or dog but will only engage with the outer face of the locking member 14.

From the foregoing description taken in connection with the accompanying drawings it will be seen that I have provided a locking means for demountable rims which may be operated in the minimum of time and with slight labor to either lock a rim upon the felly of a wheel or to permit of the rim being removed from the felly and while I have herein shown and described one specific embodiment of my invention I do not wish to be limited thereto except for such limitations as the claims may impart.

I claim:—

1. The combination with a vehicle wheel including a felly, of a rim mounted upon said felly, means to limit transverse movement of the rim upon the felly in one direction, a plate mounted upon the felly of the wheel, spaced flanges formed on said plate, a pin extending through said flanges, a locking member pivotally mounted upon said pin for engagement with the rim, a second pin carried by said flanges, and a dog mounted upon said second pin for engagement with the locking member to hold the same in engagement with the rim.

2. The combination with a vehicle wheel including a felly, of a rim mounted upon said felly, a flange plate mounted upon said felly, a pin extended through the flanges of said plate, a rim engaging member pivotally mounted upon said pin to lock said rim upon said felly, a second pin carried by said flanges, and a spring-controlled locking dog mounted upon said second pin to retain said rim-engaging member in operative position.

3. The combination with a vehicle wheel including a felly, of a rim mounted upon said felly, a flanged supporting plate mounted upon said felly, a rim engaging member pivotally mounted upon said plate and provided with a rim-receiving portion, and a shoulder opposite said portion, a dog engaged on the said shoulder to retain said rim-engaging member in operative position, and a spring for retaining said dog in engagement with said shoulder.

4. The combination with a vehicle wheel including a felly, of a rim mounted upon said felly and having a block beveled upon its inner face, said felly having its outer face beveled to receive said block, said block limiting the transverse movement of said rim in one direction across said felly, a supporting member mounted upon said felly, a locking member pivotally mounted upon said supporting means and engaged with said rim to prevent movement of the latter in a reverse direction across said felly, a dog mounted in said supporting means and engaged with said locking member to retain the latter in normal position, and a spring for retaining said dog in normal position.

In testimony whereof I affix my signature in presence of two witnesses.

RALPH J. SCHONE.

Witnesses:
HERMANN DENNIGMANN,
ALVIN E. WOLTER.